United States Patent [19]

Tamaki et al.

[11] Patent Number: 5,321,340
[45] Date of Patent: Jun. 14, 1994

[54] DRIVING METHOD FOR THREE-PHASE STEPPING MOTOR

[75] Inventors: Satoshi Tamaki; Yasuhiro Kondo, both of Hirakata; Yasufumi Ikkai, Kobe, all of Japan

[73] Assignee: Matsushita Electric Industrial Co., Ltd., Osaka, Japan

[21] Appl. No.: 861,230

[22] Filed: Mar. 31, 1992

[30] Foreign Application Priority Data

Apr. 5, 1991 [JP] Japan .................................. 3-072881

[51] Int. Cl.$^5$ .............................................. H02P 8/00
[52] U.S. Cl. ...................................... 318/696; 318/685
[58] Field of Search ................................ 318/685, 696

[56] References Cited
U.S. PATENT DOCUMENTS

| | | | |
|---|---|---|---|
| 4,833,387 | 5/1989 | Pfeiffer | 318/685 |
| 4,888,542 | 12/1989 | Muranake | 318/696 |
| 4,929,879 | 5/1990 | Wright et al. | 318/696 |
| 4,956,595 | 9/1990 | Hirofumi et al. | 318/696 |

Primary Examiner—William M. Shoop, Jr.
Assistant Examiner—Karen Masih
Attorney, Agent, or Firm—Stevens, Davis, Miller & Mosher

[57] ABSTRACT

This invention provides a driving method for a three-phase stepping motor used in various types of electrical equipment, which driving method reduces vibration peculiar to a stepping motor and can drive the stepping motor smoothly. Specifically, the driving method comprises alternating two-phase conduction of conducting a current from a first terminal to a second terminal of coils having three terminals of a three-phase stepping motor internally connected by a Y-connection with three-phase conduction of conducting the first terminal to the second terminal and from a third terminal to the second terminal simultaneously, to energize the coils sequentially according to a specified sequence, thereby making the motor rotate in units of ½ of the basic step angle with low vibration.

4 Claims, 8 Drawing Sheets

DRIVING METHOD OF A THREE-PHASE STEPPING MOTOR

DRIVING METHOD OF A THREE-PHASE STEPPING MOTOR

CONCEPTUAL DIAGRAM OF TWO-PHASE/THREE-PHASE CONDUCTION IN A THREE-PHASE STEPPING MOTOR

FIG. 3

TIMING CHART OF CURRENTS FLOWING
THROUGH COILS IN TWO-PHASE/THREE-PHASE
CONDUCTION IN A THREE-PHASE
STEPPING MOTOR

MODEL DIAGRAM OF ROTATION IN TWO-PHASE/THREE-PHASE CONDUCTION

FIG. 5

BLOCK DIAGRAM OF A TWO-PHASE/THREE-PHASE CONDUCTION CIRCUIT

FIG. 6

TIMING CHART OF EACH TRANSISTER IN
TWO-PHASE/THREE-PHASE CONDUCTION

FIG. 7

BLOCK DIAGRAM OF A DRIVING CIRCUIT FOR CHOPPING AT TIMING OF THREE-PHASE CONDUCTION

FIG. 8

MAGNETIC VECTORS PRODUCED IN TWO PHASE
CONDUCTION AND IN THREE-PHASE CONDUCTION

FIG. 9

DRIVING METHOD OF A CONVENTIONAL THREE-PHASE STEPPING MOTOR

FIG. 10

①~⑥ : CURRENT CONDUCTION DIRECTION AND PROCEDURE CONCEPTUAL DIAGRAM OF TWO-PHASE CONDUCTION IN A CONVENTIONAL THREE-PHASE STEPPING MOTOR

DRIVING METHOD FOR THREE-PHASE STEPPING MOTOR

BACKGROUND OF THE INVENTION

This invention relates to a driving method for a three-phase stepping motor.

In recent years, stepping motors have found increasing applications in automobiles. The requirements for the stepping motors for automotive use are size reduction, higher torque, and low vibration.

Figure 9:
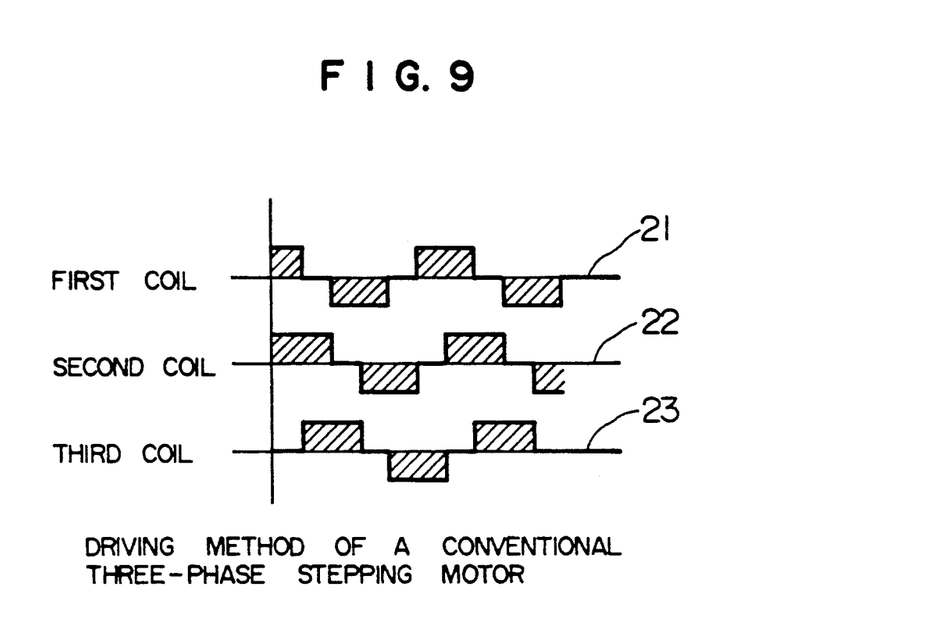
FIG. 9 is a timing chart of current conduction in the coils of a conventional three-phase stepping motor.
Figure 10:
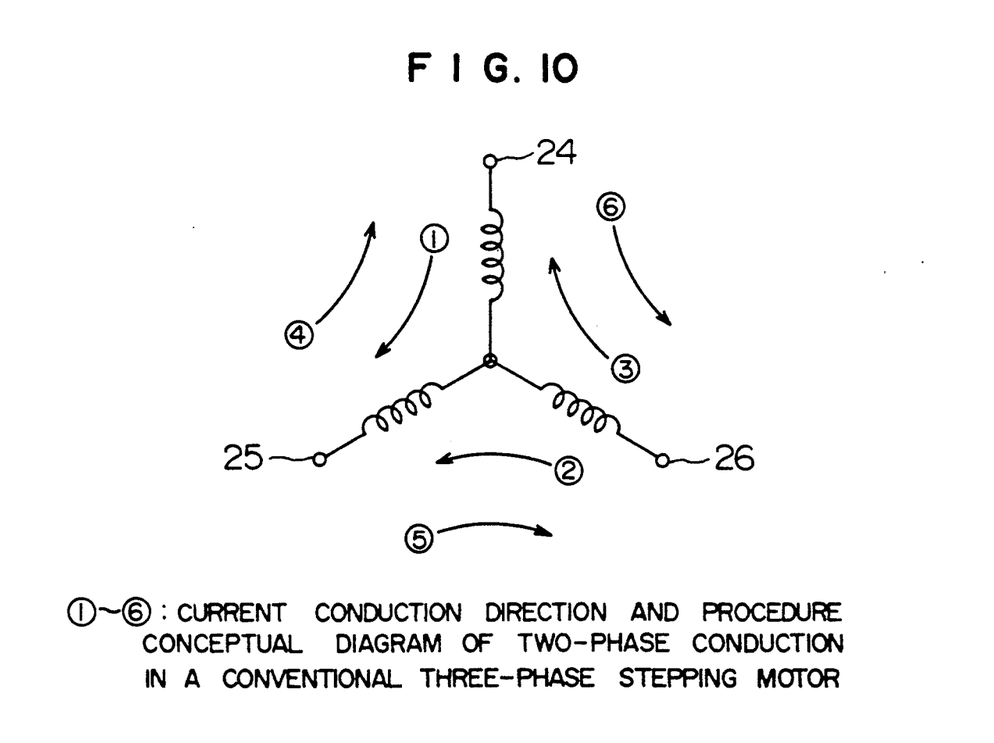
FIG. 10 is a conceptual diagram for explaining the current conduction in the coils in a conventional three-phase stepping motor.

Description will first be made of the driving method of the conventional three-phase stepping motor. FIG. 9 is a timing chart showing currents of the respective coils by the driving method of the conventional three-phase stepping motor. Reference numeral 21 denotes a current flowing through a first coil, 22 a current flowing through a second coil, and 23 a current flowing through a third coil. FIG. 10 is a conceptual diagram for explaining FIG. 9. Reference numeral 24 denotes a first terminal of a coil, 25 a second terminal of the coil, and 26 a third terminal of the coil.

Description will next be made of the driving method of the thus constructed three-phase stepping motor referring to its operation. First of all, a current is conducted from the first terminal to the second terminal. Next, a current is conducted from the third terminal to the second terminal. Subsequently, a current is conducted according to the sequence shown in the conceptual diagram. According to this power conduction method, the stepping motor rotates in units of basic step angles.

However, in the above-mentioned conventional construction, a vibration peculiar to the stepping motor is determined by the design of the stator and the rotor, which constitute the stepping motor. The conventional stepping motor has a problem that this vibration is attributable to the influence of machining accuracy, and therefore, the stepping motor cannot be used in electric equipment which is required to have low vibration.

SUMMARY OF THE INVENTION

This invention has been made to solve the conventional problem mentioned above, and has as its object to provide a driving method for a three-phase stepping motor capable of operating with low vibration.

In order to achieve this object, a driving method of a three-phase stepping motor according to the present invention, if the coils of the stepping motor are connected in Y-connection, comprises alternating two-phase conduction of conducting a current from a first terminal to a second or third terminal of the coils of the stepping motor having three terminals with three-phase conduction of conducting a current from the first terminal to the second terminal and a third terminal simultaneously or from the second and third terminals simultaneously to the first terminal of the coils of the steeping motor, to sequentially energize specific coils to thereby rotate the stepping motor. The stepping motor according to the present invention is arranged to balance the torque by two-phase conduction with the torque by three-phase conduction by making the magnetic vector by three-phase conduction equal in magnitude to the magnetic vector by two-phase conduction by changing the current value in three-phase conduction.

By this arrangement, the magnetic stable point in two-phase conduction and the magnetic stable point in three-phase conduction combine to cause the basic step angle of the stepping motor to be shifted by ½, and as two-phase conduction and three-phase conduction are alternated, the stepping motor is rotated in units of ½ of the basic step angle, thereby changing the current value in three-phase conduction to obtain a balanced torque. Therefore, this invention enables a low-vibration motor to be realized.

DESCRIPTION OF THE PREFERRED EMBODIMENT

Embodiment 1

An embodiment of the present invention will now be described with reference to the accompanying drawings.

Figure 1:
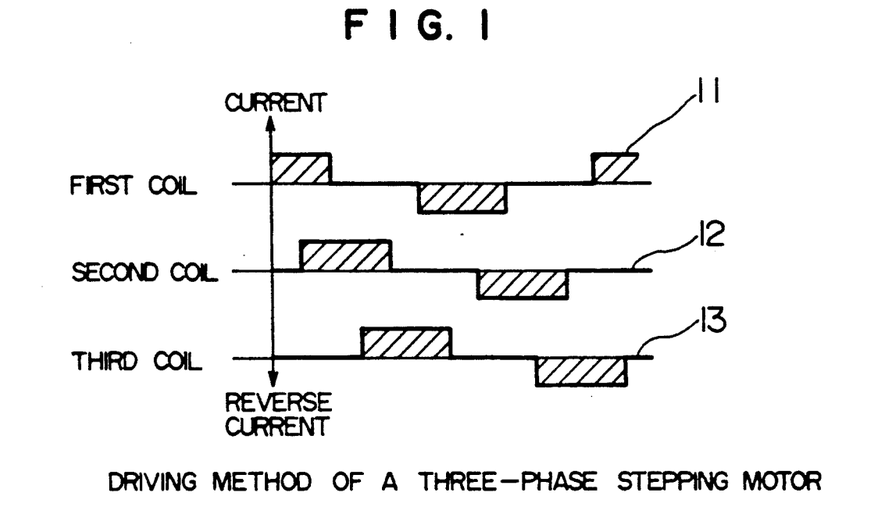
FIG. 1 is a timing chart of current conduction in the coils of a three-phase stepping motor according to a first embodiment of the present invention.
Figure 2:
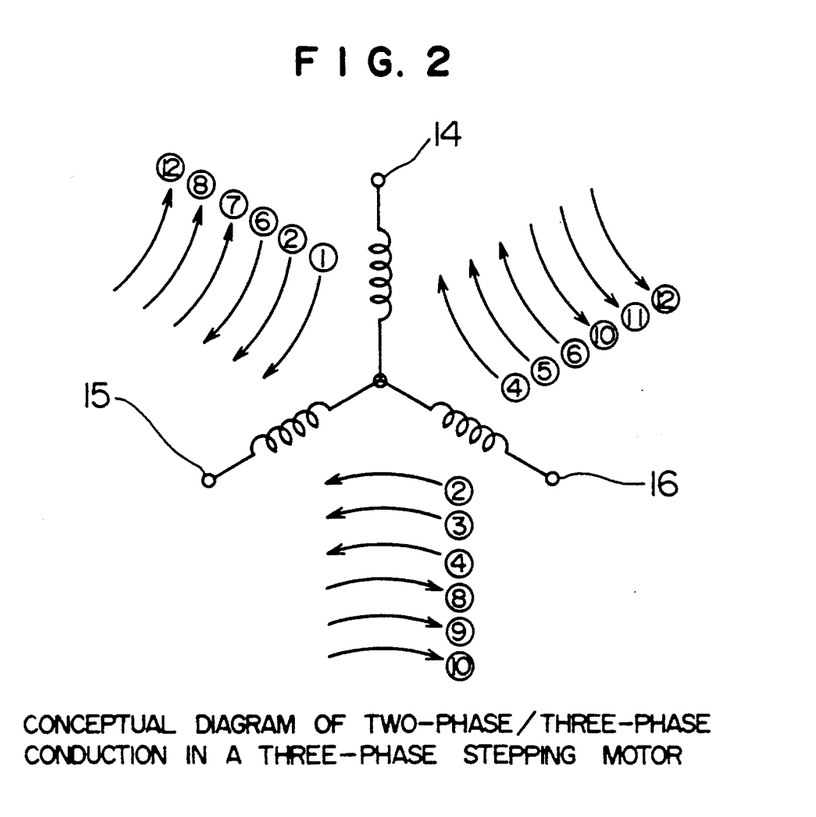
FIG. 2 is a conceptual diagram for explaining FIG. 1 in the first embodiment.
Figure 3:
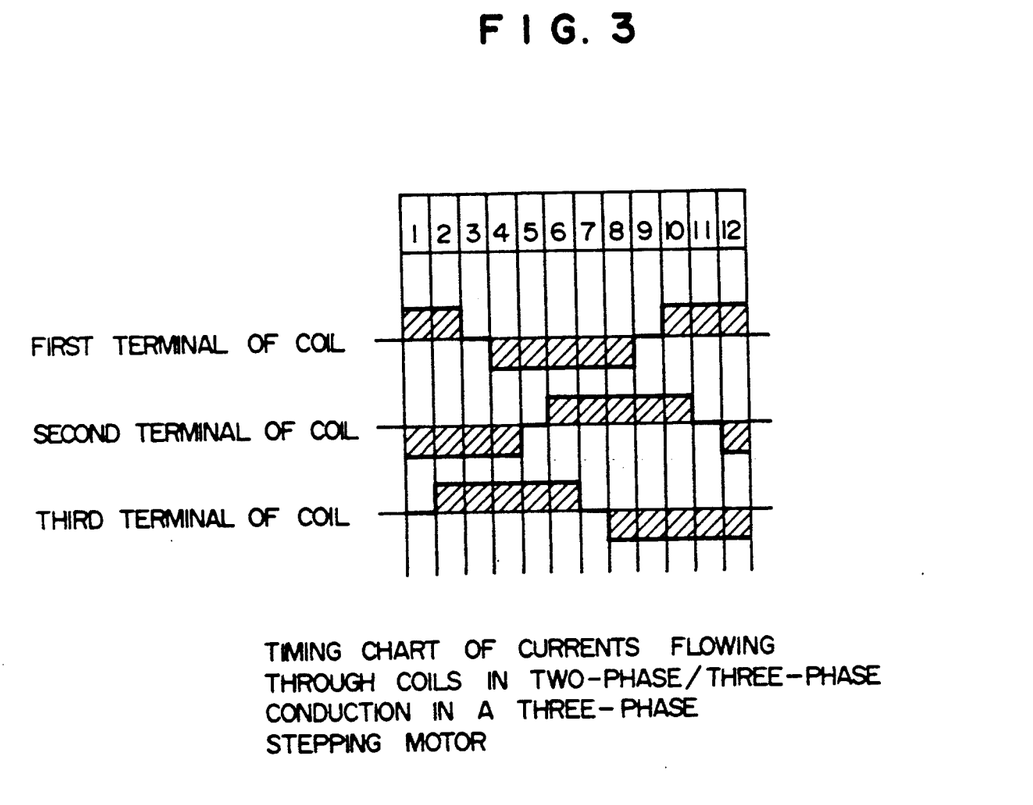
FIG. 3 is a timing chart of a current flowing the coils in two-phase/three-phase conduction in the first embodiment.

FIG. 1 is a timing chart showing currents of the coils when driving a three-phase stepping motor connected internally in Y-connection according to the present invention. Reference numeral 11 denotes a current flowing through a first coil, 12 a current flowing through a second coil, and 13 a current flowing through a third coil. FIG. 2 is a conceptual diagram for explaining FIG. 1. Reference numeral 14 denotes a first terminal of the coils, 15 a second terminal of the coils, and 16 a third terminal of the coils. FIG. 3 is a timing chart representing the sequence of currents in FIG. 2.

The method for driving a thus constructed three-phase stepping motor will be described referring to FIG. 2. To begin with, a current is conducted from the first terminal 14 to the second terminal 15 of the coils. Next, a current is conducted from the first terminal 14 to the second terminal 15, and simultaneously with this, a current is conducted from the third terminal 16 to the second terminal 15. A current is conducted successively according to the sequence shown in the conceptual coil conduction method of alternating two-phase conduction and three-phase conduction to thereby energize specific coils, the magnetic stable point in two-phase conduction and the magnetic stable point in three-phase conduction are shifted by ½ of the basic step angle, so that if driven by the above-mentioned current conduction method, this three-phase stepping motor can be rotated in units of ½ of the basic step angle.

Figure 4A:
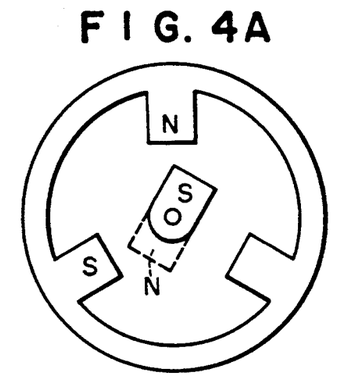
FIGS. 4A–4F are model diagrams of rotation in the alternation of two-phase conduction and three-phase conduction according to the first embodiment.
Figure 4B:
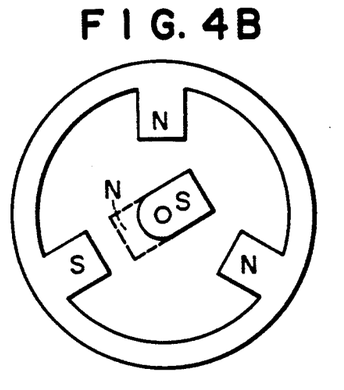
Figure 4C:
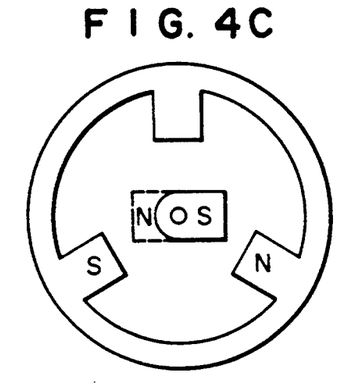
Figure 4D:
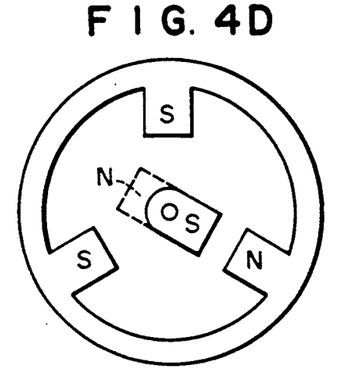
Figure 4E:
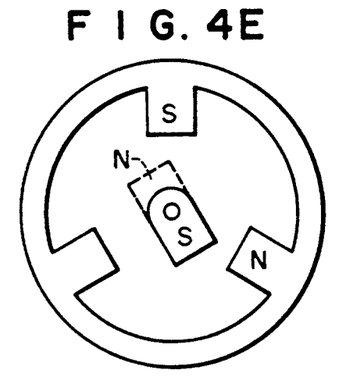
Figure 4F:
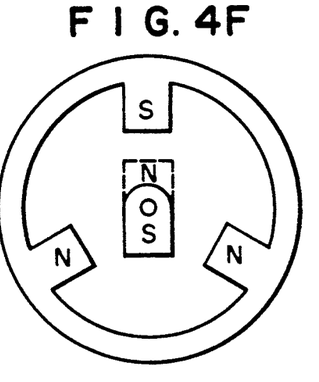

FIGS. 4A to 4F are model diagrams of rotation. FIGS. 4A, 4C and 4E show the rotational positions in two-phase conduction, while FIGS. 4B, 4D and 4F show the rotational positions in three-phase conduction. When two-phase conduction and three-phase conduction are alternated, the motor rotates in the order of FIG. 4A→FIG. 4B→FIG. 4C→FIG. 4D→FIG. 4E→FIG. 4F. As is evident from those figures, if a comparison is made between two-phase conduction and a conduction method of alternating two-phase conduction and three-phase conduction, it is understood that by the latter conduction method according to this embodiment, the motor rotates in units of ½ of the basic step angle.

Figure 5:
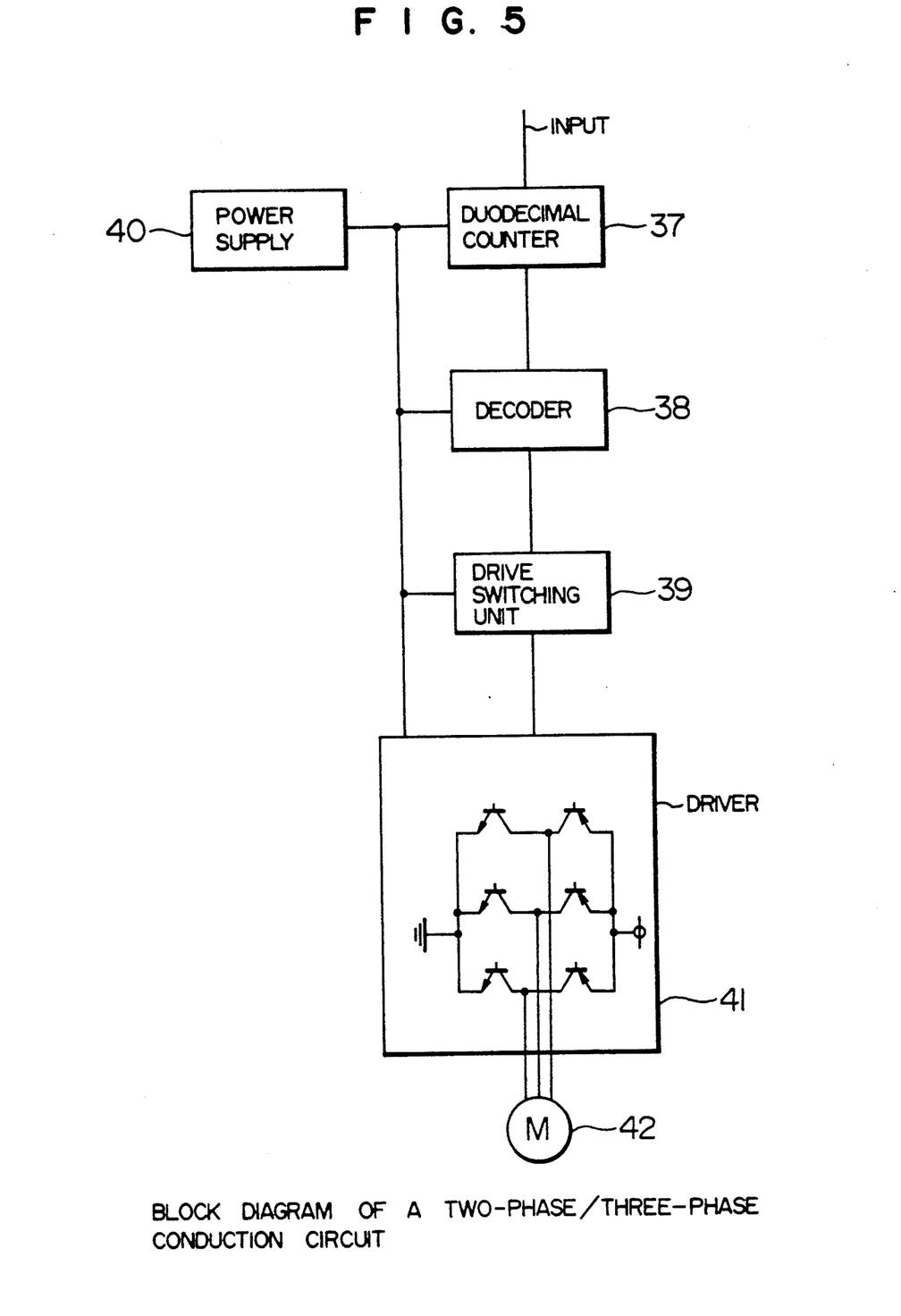
FIG. 5 is a circuit block diagram for realizing two-phase/three-phase conduction in the first embodiment.
Figure 6:
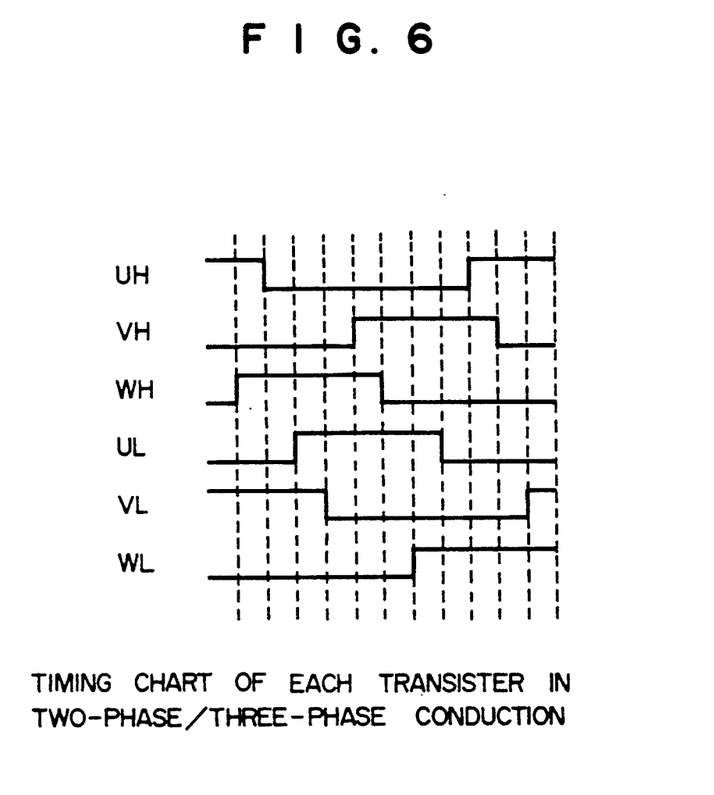
FIG. 6 is a timing chart for six driver transistors in the first embodiment.

FIG. 5 is a driving circuit block diagram of a three-phase stepping motor according to this embodiment. Reference numeral 37 denotes a duodecimal counter, 38 a decoder, 39 a drive switching unit, 40 a power supply, 41 a driver, and 42 a motor. First of all, command pulses are input to the duodecimal counter 37. The counter output changes from 0 to 11 in synchronism with command pulses. Those values are decoded by the decoder 38, and the six transistors of the driver 41 are turned ON according to output signals from drive switching unit 39 to thereby energize the coils of the motor in compliance with the sequence of FIG. 2. FIG. 6 is a timing chart for turning ON the transistors where among the six transistors, high-side transistors are designated as UH, VH and WH, and low-side transistors are designated as UL, VL and WL.

As is understood from the above description, according to this embodiment, by using a coil current conduction method of alternating two-phase conduction with three-phase conduction to sequentially energizing the specific coils, the motor can be rotated in units of ½ of the basic step angle, so that a stepping motor which is driven with low vibration can be created.

Embodiment 2

In the case of means of Embodiment 1, because the current value in two-phase conduction differs from the current value in three-phase conduction, torque ripples remain when the motor rotates and cause vibration. A method of driving a motor with lower vibration than in the driving method shown in the first embodiment will be described in the following.

A second embodiment of the present invention is described with reference to the accompanying drawings.

Figure 7:
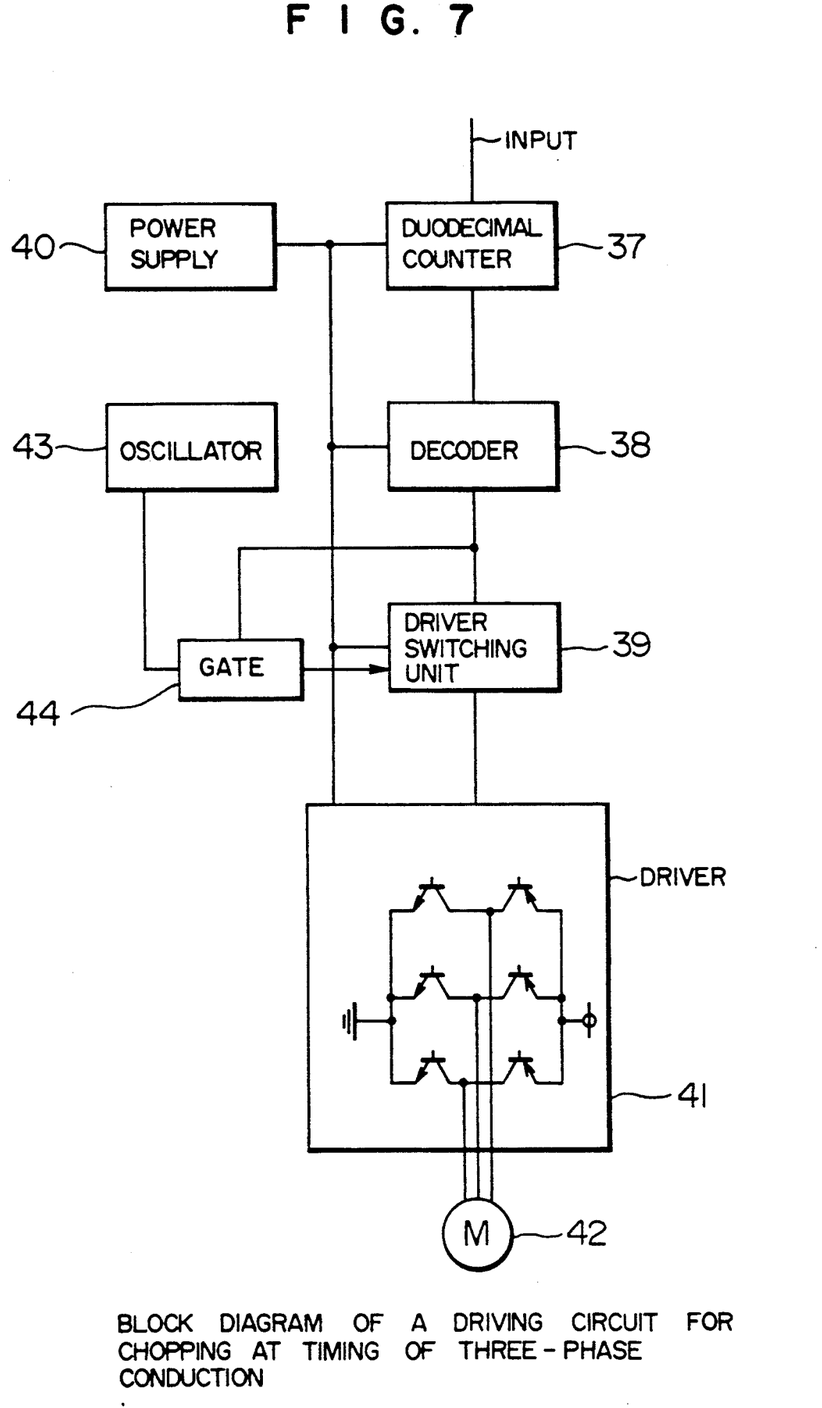
FIG. 7 is a circuit block diagram for realizing chopping by three-phase conduction timing in a second embodiment.

In FIG. 7, reference numeral 37 denotes a duodecimal counter, 38 a decoder, 39 a drive switching unit, 40 a power supply, 41 a driver, and 42 a motor, and all those components are the same as in the construction of FIG. 5. Differences from the construction of FIG. 5 are an oscillator 43 and a gate circuit 44 which are added.

The method of driving a three-phase stepping motor constructed as mentioned above will be described referring to its operation. Clock pulses from the oscillator 43 are input to the gate circuit 44, and clock pulses are output from the gate circuit 44 according to command pulse timing of three-phase conduction specified by the decoder 38 to perform chopping of the drive switching unit 39.

Figure 8:
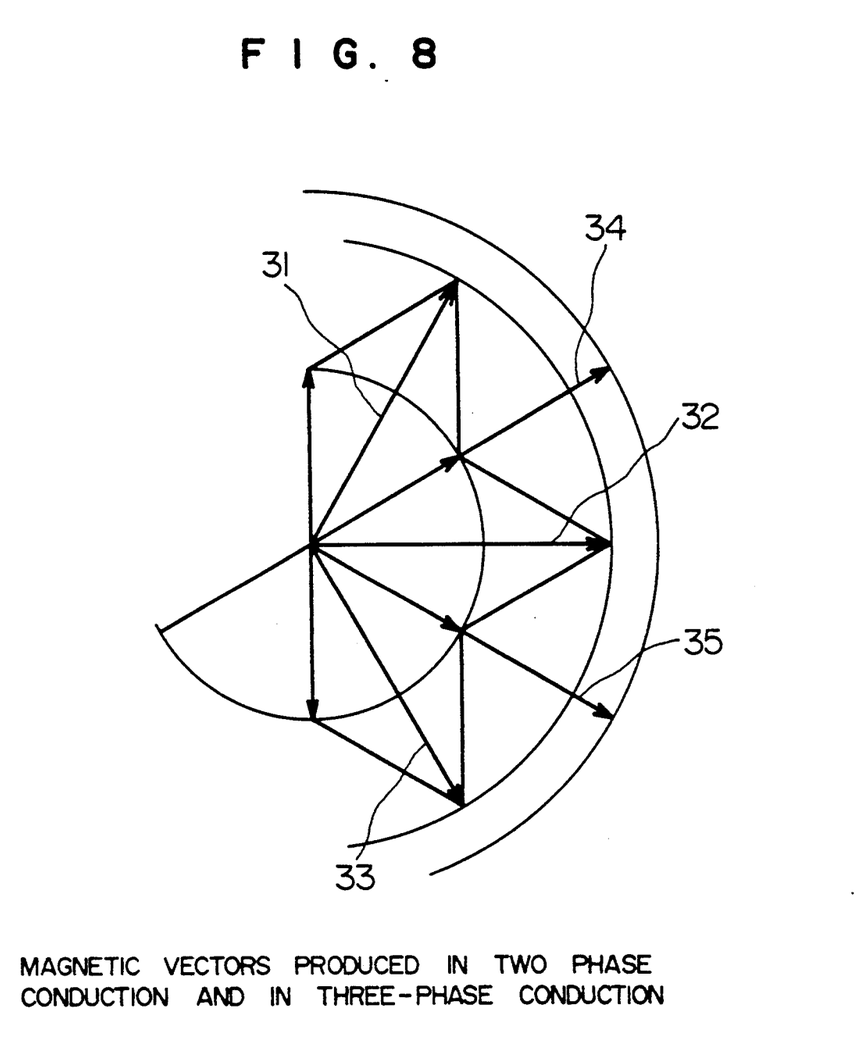
FIG. 8 is a diagram showing magnetic vectors occurring in two-phase conduction and in three-phase conduction in the second embodiment.

The effective current value is reduced to $\sqrt{3/2}$ times the current value before chopping by suitably selecting clock pulses of the oscillator 43 for chopping the current in three-phase conduction, and by this effective current, the magnetic vector in three-phase conduction is made equal in magnitude to the magnetic vector in two-phase conduction, so that an unbalance of torque between two-phase conduction and three-phase conduction can be eliminated. FIG. 8 shows magnetic vectors which occur in two-phase conduction and in three-phase conduction. In FIG. 8, reference numerals 31, 32, and 33 denote magnetic vectors which occur in two-phase conduction, while reference numerals 34 and 35 denote magnetic vectors which occur in three-phase conduction. The two-phase conduction sequence is for magnetic vector 31-32-33, by which the motor rotates. The two-phase/three-phase conduction sequence is for magnetic vector 31-34-32-35-33, by which the motor rotates.

As described above, it is possible to realize a method of driving a three-phase stepping motor by adding the oscillator 43 and the gate circuit 44, synchronizing the output of clock pulses with three-phase conduction command timing to perform the chopping of three-phase conduction currents to reduce the effective current value to $\sqrt{3/2}$ times the current value, and by this effective current, making equal the magnitudes of the magnetic vectors which occur in two-phase conduction and in three-phase conduction to thereby eliminate torque ripples and enable the motor to be driven with low vibration.

To reduce the three-phase conduction current value to $\sqrt{3/2}$ times the current value before chopping, the current is chopped in this embodiment. However, needless to say, the same effect can be obtained by controlling the voltage to reduce the current.

As is clear from the foregoing description, this invention realizes a driving method for a three-phase stepping motor comprising alternating two-phase conduction wit three-phase conduction in driving a three-phase stepping motor internally connected by a Y-connection and energizing specific coils of the motor. By this driving method, the vibration peculiar to the stepping motor can be decreased, and moreover, thanks to the Y-connection of the coils, only three lead wires are required, and the limitations on assembling have been reduced.

What is claimed is:

1. A method for driving a three-phase stepping motor having three terminals internally connected by a Y-connection, said method comprising the steps of:
    combining two-phase conduction an three-phase conduction, said two-phase conduction including conducting a current from one terminal to any other terminal of coils of said stepping motor, said three-phase conduction including conducting a current from one terminal to the two other terminals simultaneously or from two terminals to the remaining one terminal simultaneously; and
    alternating said two-phase conduction with said three-phase conduction to sequentially energize specific coils to make said stepping motor rotate in units of ½ of the basic step angle.

2. A method for driving a three-phase stepping motor according to claim 1, wherein the alternating of said two-phase conduction and said three-phase conduction includes reducing a current value in said three-phase conduction to produce a torque substantially equal to a torque produced in said two-phase conduction in synchronism with a timing of said three-phase conduction.

3. A three-phase stepping motor comprising: p1 three terminals internally connected in a Y-connection;

means for performing two-phase conduction, wherein a current is conducted from one terminal to any other terminal of said stepping motor;

means for performing three-phase conduction, wherein a current is conducted from one terminal to the two other terminals of said stepping motors simultaneously or a current is conducted from two terminals of said stepping motor to the remaining terminal of said stepping motor simultaneously; and means for alternating said two-phase conduction with said three-phase conduction to sequentially energize specific coils of said stepping motor to make said stepping motor rotate in units of ½ of the basic step angle.

4. A three-phase stepping motor according to claim 3, further comprising means for reducing a current value during said three-phase conduction in comparison to said two-phase conduction so as to produce a torque substantially equal to a torque produced in two-phase conduction in synchronism with a timing of said three-phase conduction.

* * * * *